(12) United States Patent
Baert et al.

(10) Patent No.: US 11,326,356 B2
(45) Date of Patent: May 10, 2022

(54) FLOOR OR WALL PANEL

(71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: CHAMPION LINK INTERNATIONAL CORPORATION

( * ) Notice: Subject to any disclaimer, the term of this patent is extended or adjusted under 35 U.S.C. 154(b) by 0 days.

(21) Appl. No.: 16/929,901

(22) Filed: Jul. 15, 2020

(65) Prior Publication Data

US 2022/0018139 A1  Jan. 20, 2022

(51) Int. Cl.
*E04F 15/08* (2006.01)
*E04F 13/08* (2006.01)
(Continued)

(52) U.S. Cl.
CPC ............. *E04F 15/082* (2013.01); *B32B 3/06* (2013.01); *B32B 7/12* (2013.01); *B32B 9/005* (2013.01); *B32B 9/048* (2013.01); *B32B 37/06* (2013.01); *B32B 37/12* (2013.01); *E04F 13/0894* (2013.01); *E04F 13/142* (2013.01); *E04F 15/02038* (2013.01); *B32B 2037/1253* (2013.01); *B32B 2250/02* (2013.01); *B32B 2307/72* (2013.01); *B32B 2307/7265* (2013.01);
(Continued)

(58) Field of Classification Search
CPC ................ E04F 15/082; E04F 13/0894; E04F 15/02038; E04F 13/142; B32B 9/005; B32B 2419/04; B32B 2307/7265; B32B 2250/02; B32B 2037/1253
See application file for complete search history.

(56) References Cited

U.S. PATENT DOCUMENTS 2,944,291 A  10/1957 Prior et al.
3,421,597 A   1/1969 Blau
(Continued)

FOREIGN PATENT DOCUMENTS

CA   2523866    11/2004
CN   100419019   2/2007
(Continued)

OTHER PUBLICATIONS

International Search Report and Written Opinion for corresponding App. No. NL 2024807 dated Sep. 18, 2020.
(Continued)

*Primary Examiner* — Patrick J Maestri
(74) *Attorney, Agent, or Firm* — Emerson, Thomson & Bennett, LLC; Roger D. Emerson; Peter R. Detorre (57) ABSTRACT

The invention relates to a panel, in particular a floor panel or a wall panel configured for forming a floor or wall covering, the panel comprising at least one core layer, the core layer comprising at least one pair of opposite side edges which are provided with complementary coupling parts configured for interconnecting adjacent panels, the core layer comprising an upper core surface and a bottom core surface, and at least one ceramic tile, the ceramic tile comprising an upper surface and a bottom surface and the panel further comprising at least one further layer.

20 Claims, 3 Drawing Sheets

(51) Int. Cl.
  *E04F 13/14* (2006.01)
  *B32B 3/06* (2006.01)
  *B32B 7/12* (2006.01)
  *B32B 9/00* (2006.01)
  *B32B 9/04* (2006.01)
  *B32B 37/06* (2006.01)
  *B32B 37/12* (2006.01)
  *E04F 15/02* (2006.01)

(52) U.S. Cl.
  CPC ..... *B32B 2307/732* (2013.01); *B32B 2309/02* (2013.01); *B32B 2309/105* (2013.01); *B32B 2419/04* (2013.01)

(56) References Cited

U.S. PATENT DOCUMENTS

| | | | |
|---|---|---|---|
| 3,931,428 | A | 1/1976 | Reick |
| 4,278,728 | A | 7/1981 | Honda |
| 5,336,551 | A | 8/1994 | Gravier |
| 5,631,053 | A | 5/1997 | Andersen |
| 5,693,395 | A | 12/1997 | Wine |
| 5,776,580 | A | 7/1998 | Rasmussen |
| 6,688,061 | B2 | 2/2004 | Garcia |
| 6,761,794 | B2 | 7/2004 | Mott |
| 6,933,043 | B1 | 8/2005 | Son |
| 7,255,907 | B2 | 8/2007 | Feigin et al. |
| 7,399,510 | B2 | 7/2008 | Dupouy |
| 7,866,103 | B2 | 1/2011 | Marschke |
| 7,918,062 | B2 | 4/2011 | Chen |
| 8,287,991 | B2 | 10/2012 | Donelson |
| 8,419,877 | B2 | 4/2013 | Pervan |
| 10,328,680 | B2 | 6/2019 | Pervan |
| 10,563,411 | B2 * | 2/2020 | Patki ................. B32B 9/002 |
| 10,828,881 | B2 | 11/2020 | Bergelin |
| 2003/0233809 | A1 | 12/2003 | Pervan |
| 2005/0208258 | A1 | 9/2005 | Hosokawa |
| 2005/0286397 | A1 | 12/2005 | Inagaki |
| 2006/0115442 | A1 | 6/2006 | Katz |
| 2007/0033891 | A1 | 2/2007 | Imbabi |
| 2008/0149137 | A1 | 6/2008 | Steinbrenner |
| 2008/0318004 | A1 | 12/2008 | Ruhe |
| 2009/0011279 | A1 | 1/2009 | Wisenbaker, Jr. et al. |
| 2009/0017320 | A1 | 1/2009 | Donelson |
| 2009/0155612 | A1 | 6/2009 | Pervan |
| 2009/0235607 | A1 | 9/2009 | Chen |
| 2009/0308001 | A1 | 12/2009 | Wu |
| 2010/0115974 | A1 | 5/2010 | Okaza |
| 2011/0067336 | A1 | 3/2011 | McDonald |
| 2013/0295346 | A1 | 11/2013 | Ferguson |
| 2014/0087156 | A1 | 3/2014 | Sarkis |
| 2014/0134402 | A1 | 5/2014 | Pallon |
| 2014/0272302 | A1 | 9/2014 | Ciuperca |
| 2015/0059621 | A1 | 3/2015 | Hauber |
| 2015/0121793 | A1 | 5/2015 | Segeart |
| 2016/0214395 | A1 | 7/2016 | Torfs |
| 2016/0288447 | A1 | 10/2016 | Cordeiro |
| 2016/0369507 | A1 | 12/2016 | Pervan |
| 2017/0204616 | A1 | 7/2017 | Scholz |
| 2017/0217133 | A1 | 8/2017 | Jordan et al. |
| 2018/0147873 | A1 | 5/2018 | De Mondt |
| 2018/0258651 | A1 | 9/2018 | Meersseman |
| 2018/0283014 | A1 | 10/2018 | Hodgkins et al. |
| 2019/0292793 | A1 | 9/2019 | Van Vlassenrode |
| 2019/0308914 | A1 | 10/2019 | Kong |
| 2019/0383031 | A1 | 12/2019 | Baert |
| 2020/0039190 | A1 | 2/2020 | Lenaerts |
| 2020/0080321 | A1 | 3/2020 | Baert |
| 2020/0123788 | A1 | 4/2020 | Baert |
| 2020/0131784 | A1 | 4/2020 | Boucke |
| 2020/0207118 | A1 | 7/2020 | Lenaerts |
| 2020/0218415 | A1 | 7/2020 | Jang |
| 2020/0308846 | A1 | 10/2020 | Josefsson |

FOREIGN PATENT DOCUMENTS

| | | |
|---|---|---|
| CN | 101386516 | 3/2009 |
| DE | 102012000468 | 7/2013 |
| EP | 2060389 | 5/2009 |
| EP | 2690142 A1 | 1/2014 |
| EP | 3536874 | 9/2019 |
| GB | 2509821 | 7/2014 |
| JP | H0828015 | 1/1996 |
| KR | 20140066086 | 5/2014 |
| SE | 19503648 | 3/2019 |
| WO | 2007111552 | 10/2007 |
| WO | 2012004701 | 1/2012 |
| WO | 2012061300 | 5/2012 |
| WO | 2014007738 | 1/2014 |
| WO | 2014011110 | 1/2014 |
| WO | 2018234561 A1 | 12/2018 |
| WO | 2019064113 A1 | 4/2019 |
| WO | 2020009973 | 1/2020 |
| WO | 2020114645 | 6/2020 |
| WO | 2020197475 | 10/2020 |

OTHER PUBLICATIONS

International Search Report and Written Opinion for corresponding App. No. NL 2024806 dated Nov. 26, 2020.
International Search Report and Written Opinion for corresponding PCT App. No. NL 2024805 dated Sep. 23, 2020.
International Search Report and Written Opinion of corresponding Application No. NL 2025119 dated Jan. 14, 2021.
International Search Report and Written Opinion of corresponding PCT Application No. NL2025684, dated Mar. 3, 2021.
Search Report and Written Opinion for Corresponding International Patent Application No. NL 2026068, dated Feb. 4, 2021.
Search Report and Written Opinion for Corresponding International Patent Application No. NL 2025620, dated Feb. 8, 2021.
Search Report and Written Opinion for Corresponding International Patent Application No. NL 2026069, dated Feb. 5, 2021.

* cited by examiner

FLOOR OR WALL PANEL

The invention relates to a panel, in particular a floor panel or a wall panel configured for forming a floor or wall covering. The invention also relates to a method for manufacturing a panel, in particular a floor panel or a wall panel configured for forming a floor or wall covering.

Ceramic tiles are often used for both flooring- and wall coverings. They benefit of a good strength and durability and in addition to that they are appreciated for their appealing aesthetic appearance. Due to their good temperature resistance and their hardness, ceramic tiles benefit a high wear and corrosion resistance, which make them suitable for both indoor- and outdoor use. A drawback of the use of ceramic tiles it that they are both difficult to install and difficult to remove, due to their installation on mortar. The bottom surface of conventional tiles are usually designed to optimize contact surface with mortar through the application of cavities up to several millimeters deep at said bottom surface that allow more complete adhesion with said mortar during installation. It can be said that the mortar is allowed to fill the cavities at the back surface of conventional tile, so as to support the tile body to withstand intensive use and heavy loads without breaking. This is achieved by the laying the tiles on large amounts of mortar during installation, generally around 5 lbs per 10 square feet, that completely cover said back surface. After installation and curing of the mortar, generally a grout is applied in the gaps between the tiles for visual effect and achieving a waterproof bond. This grout is generally composed of a cement or epoxy and is hard and brittle after curing. Correct installation of ceramic tiles without height differences and an even grout or gap between tiles on this thick layer of mortar is a precision task which typically requires an expert. The installation can be said to be permanent as there is a cured bond between the substrate and tiles and between individual tiles, therefore removal of tiles is generally difficult, costly and time consuming.

It is known to provide a combination of a ceramic tile and a polymer-, mineral- or wood-based core layer wherein the core layer is provided with interconnecting coupling means in order to allow for easier and floating installation of the tiles, obviating the need for adhesives or mortar and enabling installation even by the non-professional or home handyman. This combination is achieved through the application between the core layer surface and the ceramic top layer of a bonding system, generally an adhesive layer. The application of such an adhesive layer according to the current state of the art however can create unwanted stresses in the core body of the tile, leading to breakage, cracks, hairline fractures when exposed to temperature fluctuations. This fragility is highly undesirable for the use in a panel for forming a floor or wall covering. Moreover, the application of such an adhesive creates difficulties in production, and leads to unwanted staining or discoloration that can become evident in the top surface of the tile.

Moreover, as described above, conventional ceramic tiles feature cavities on the back surface to ensure increased bonding with a thick layer of mortar or adhesive. However, when these conventional ceramic tiles are combined with a substrate that does not offer support to the tile, they are prone to fracturing and breakage. This can be easily explained due to insufficient support on the back surface of the tiles at the location of the cavities. Even slight stress in the body of the ceramic, porcelain and stone tiles occurring during use can lead to deformation at said location on the back surface, surface crazing (multiple hairline fractures) on the top surface opposite of said location, and breakage. It can be said that conventional tiles featuring cavities on the back surface, designed to be installed on mortar, are not suitable to be combined with a polymer-, mineral- or wood-based core layer.

It is a goal of the invention to provide a panel and/or method for manufacturing a panel which at least partially overcomes the abovementioned drawbacks, or which is at least an alternative to the presently known panels.

The invention provides thereto a panel, in particular a floor panel or a wall panel configured for forming a floor or wall covering, comprising:

at least one core layer comprising an at least one pair of opposite side edges which is provided with an at least two complementary coupling parts, an upper core surface and a bottom core surface; and at least one ceramic tile comprising an upper surface and a bottom surface, wherein the bottom surface defines a bottom surface area;

at least one adhesive layer provided between the ceramic tile and the core layer; wherein the bottom surface of the ceramic tile comprises pores, wherein the pores define a void surface area, and wherein the contact surface area between the adhesive layer and the ceramic tile is defined by the difference between the bottom surface area and the void surface area.

That the contact surface area between the adhesive layer and the ceramic tile being defined by the difference between the bottom surface area and the void surface area enables the adhesive layer to provide sufficient adhesion between the core layer and the ceramic tile whilst not negatively affecting the overall properties of the panel. Basically, the adhesive layer seals off the pores in the bottom surface of the ceramic tile without permeating or ingressing into the pores that are present in the tile body. The adhesive layer is attached to the bottom surface of the ceramic tile, in particular at the material surface area. The bottom surface area is basically the geometric bottom surface area, which includes the material surface area and the void surface area. When the overall bottom surface area of the ceramic tile is considered, this would include the (inner) surface area of all surface pores located on the bottom surface of the tile which would be considerably larger than the geometric surface area of the ceramic tile.

Further, the panel according to the present invention benefits the material advantages of a ceramic tile whilst being relatively easy to install. This is enabled due to the panel comprising a combination of at least one ceramic tile and at least one core layer which comprises at least one pair of opposite side edges which are provided with complementary coupling parts. Installation of a plurality of adjacent panels such that a wall- or floor covering can be formed is facilitated by the complementary coupling parts of the core layers. Due to the presence of said complementary coupling parts, there is no need for experts to install the wall- or floor covering, but this can typically be done by any person. Also, the removal of one or more panels is relatively easy. This is for example desirable in case a ceramic tile needs to be replaced.

The top surface of ceramic tiles is generally finished with a lacquer or glazing that is completely waterproof. There is however ingress possible into the bottom surface of the tiles by liquids or materials that have a high liquidity. The core body of the ceramic tile can be defined as the region of the tile enclosed between the upper surface and the bottom surface. Ceramic tiles typically feature a certain porosity and are classified according to their water absorption rate. This can be measured by standard testing method ASTM C373.

Ceramic tiles with a water absorption rate of less than 0.5% can by definition be called porcelain tiles, those with a water absorption rate of less than 5% can be called ceramic tiles. Ceramic tiles generally have pores of about 0.05 to 1 mm diameter, porcelain tiles have pores between 1 to 200 micrometers. The bottom surface of the tile has a number of pores that are exposed. These surface pores can be connected to pores that are distributed across the volume of the ceramic tile body. The larger, more numerous, and more connected the pores are, the higher the tile's water absorption. Due to the presence of at least one adhesive layer according to the present invention, the ingress of materials into the bottom surface of the tiles by liquids or materials that have a high liquidity can be prevented.

In particular, the contact surface area between the adhesive layer and the bottom surface of the ceramic tile is defined by the difference between the bottom surface area and the void surface area. The panel according to the invention is typically manufactured via the corresponding method according to the present invention. That the contact surface area between the adhesive layer and the bottom surface of the ceramic tile is defined by the difference between the bottom surface area and the void surface area is basically the effect of at least one adhesive forming the adhesive layer having a viscosity of at least 1,000 Pas at time of application. An adhesive having a viscosity of at least 1,000 Pas is relatively viscous wherefore an adhesive layer can be obtained having several benefits.

Similarly, fluids other than water that have a relatively low viscosity can also ingress into the body through the bottom surface of ceramic tiles. The viscosity of a fluid is a measure of its resistance to deformation at a given rate and can be measured in pascal-seconds or Pas. To illustrate, at 20 degrees Celsius, the viscosity or liquidity of water is 1 Pas. Most adhesives, prior to curing, have values of 3 Pas, while ketchup, peanut butter, and silicon putty have viscosities of 50 Pas, 250 Pas, and 100,000 Pas, respectively.

For the background of this invention, a material with a viscosity of less than 1,000 Pas is understood as having a comparatively low viscosity, and a material with a viscosity of more than 1,000 Pas a comparatively high viscosity. A low viscosity enables an easy flow, quick adjustment to the shape of a container or reservoir that might contain the material, and the ability to ingress and transfer through openings with a diameter smaller than those with a material with high viscosity. In the case of adhesives, the viscosity of the adhesive is defined as the viscosity at the time of application of the adhesive, prior to curing.

Many adhesives have a viscosity of less than 1,000 Pas, and can have a viscosity as low as 3 Pas, close to the viscosity of water, prior to their curing. When such adhesive with low viscosity is applied to the bottom surface of a ceramic tile, it will ingress into the tile's pores prior to solidifying and/or curing. The ingress rate increases with the ceramic tile's porosity. The ingress of an adhesive into the ceramic tile increases the contact surface between adhesive and the overall bottom surface area of the ceramic tile. The contact surface area of the adhesive is then larger than the geometric surface area of the ceramic tile's bottom surface area. When said adhesive ingresses in the core body of the ceramic tile however, its thermal expansion and contraction rate can create unwanted stresses in the core body of the ceramic tile, leading to breakage, cracks, hairline fractures when exposed to temperature fluctuations. This fragility is highly undesirable for the use in a panel for forming a floor or wall covering. Moreover, the application of an adhesive with such a low viscosity or high fluidity creates difficulties in production, as its application on large flat surfaces lead to practical issues such as overflow.

It was surprisingly found that a specially engineered adhesive layer according the invention, in particular having a viscosity higher than 1,000 Pas at time of application, can provide sufficient adhesion between the core layer and the ceramic tile whilst not negatively affecting the overall properties of the panel. The use of an adhesive layer comprising an adhesive having a viscosity higher than 1,000 Pas also allows for an easier method of manufacturing. As described for the corresponding method according to the present invention, the finished panel can be formed by applying an adhesive with a high viscosity onto the upper flat surface of the core layer and subsequently positioning the ceramic tile onto the upper surface of the core layer which is provided with adhesive. When the adhesive has a relatively high viscosity, a precise application on a flat surface is possible, avoiding problems of overflow completely. The effect of this high viscosity is a much reduced contact area between adhesive and tile compared to an adhesive with low viscosity, and the elimination of ingress of the adhesive into the ceramic core. It can be said that the contact area between adhesive and bottom surface of the ceramic tile is smaller, or at most the same, as the geometric bottom surface area of the ceramic tile.

The use of an adhesive layer with a viscosity of less than 1,000 Pas at time of application also leads to unwanted staining or discoloration that can become evident in the top surface of the tile. This problem is also solved by this invention by using an adhesive with a higher viscosity value, inhibiting the adhesives' permeation into the ceramic tile's bottom surface and contamination of the decor.

Another major advantage of using an adhesive layer with a high viscosity include the possibility to apply the layer at an increased thickness compared to adhesive layers with low viscosity. This allows for compensation for height differences, macroscopic undulations and/or unevenness in the bottom surface of the tile. These height difference or undulations are generally larger than 1 mm in width, but can even be up to 30 mm in width and 1-2 mm in depth. These undulations commonly occur in conventional tiles and form possible breaking points if not properly supported after installation. The adhesive layer according to the invention then offers an overall improvement in the durability of the panel when conventional ceramic tiles are combined with substrates which insufficiently support the bottom surface of the tile, generally substrates with a substantially flat top surface. Adhesive layers with low viscosity at application are not able to set into a thick enough adhesive layer or support to a conventional ceramic tile, which generally features macroscopic undulations and/or unevenness in the bottom surface to allow installation on mortar. An adhesive layer with high viscosity however can be applied in a larger volumes, mold itself to the shape of the macroscopic undulations and/or unevenness, which upon curing dissipates stresses evenly across the surface, preventing deformation, surface crazing (multiple hairline fractures), and even breakage of the ceramic tile.

The adhesive layer forms a protective layer for the ceramic tile and enables attachment, in particular double sided attachment, between at least one core layer and at least one ceramic tile. It is conceivable that the bottom surface of the ceramic tile comprises macroscopic undulations, preferably having a width between 1-50 mm and a depth between 0.1-2 mm. In a further preferred embodiment, the shape of the top surface of the adhesive layer conforms to the macroscopic undulations of the tile bottom surface.

Preferably, the upper surface of the adhesive layer substantially follows the contours of the macroscopic undulations or back surface texture of the ceramic tile, while not ingressing into the microscopic pores present in the ceramic tile body. In this way, an improved adhesion between the ceramic tile and the adhesive layer can be obtained whilst not negatively affecting the strength of the panel.

In a possible embodiment, at least one adhesive is a polymer resin. Preferably, the adhesive is a single-component adhesive. More preferably, the adhesive can be a single-component adhesive comprising polyurethane. Typically, the adhesive is non-liquid when applied, the adhesive can for example be substantially viscous. It can for example be said that the adhesive is applied as viscoelastic liquid. The applied quantity of adhesive per square meter is preferably around 85 to 100 g/m2. At least one adhesive layer can be formed by a protective coating, in particular a polymer coating. At least one adhesive layer may further have shock absorbing properties. Hence, the impact of the weight or forces applied upon the ceramic tile can be mitigated in a more efficient manner.

In a preferred embodiment, the adhesive layer seals off the surface pores in the bottom surface of the ceramic tile without permeating or ingressing the pores that are present in the tile body. When the water absorption rate of the ceramic tile is <0.5%, the inventors note that a viscosity of >1,000 Pas is sufficient to assure the advantages of the invention. When the water absorption rate Ar of the ceramic tile is $0.5\%<Ar<7\%$, it is noted that a viscosity of >12,000 Pas is preferred to assure the advantages of the invention.

Typically, the adhesive layer is provided between the bottom surface of the ceramic tile and the upper core surface of the core layer. Hence, the adhesive layer is substantially enclosed between the ceramic tile and the core layer. The adhesive layer according to the present invention is preferably configured to substantially seal the pores and/or openings at the bottom surface of the ceramic tile.

In a beneficial embodiment, the adhesive layer is impermeable. More in particular, in a possible embodiment the adhesive layer is at least impermeable to liquids. The adhesive layer being impermeable may further contribute to the durability of the panel by further preventing the ingress of alien materials into the core body of the ceramic tile. A liquid impermeable adhesive layer may further enhance the protective function of the adhesive layer and thus further contribute to the durability of the panel. It is also conceivable that the adhesive layer is impermeable to vapor.

The complementary coupling parts are typically configured for interconnection adjacent panels. Typically, at least one pair of opposite side edges of the core layer is provided with complementary coupling parts. For example, the core layer comprises at least one pair of complementary coupling parts on at least two of its opposite side edges. Said coupling parts may for example be interlocking coupling parts configured for mutual coupling of adjacent panels on multiple directions. Preferably, said interlocking coupling parts provide locking in both horizontal and vertical directions. Any suitable interlocking coupling parts as known in the art could be applied. For example, said interlocking coupling parts may be in the form of complementary tongue and groove, male and female receiving parts, a projecting strip and a recess configured to receive said strip or any other suitable form. It is conceivable the complementary coupling parts require a downward scissoring motion when engaging, or are locked together by means of a horizontal movement. It is conceivable for provisions of reinforcement in the interlocking coupling parts to improve strength and prevent breakage thereof during installation of the panels. For example, the complementary or interlocking coupling parts may be reinforced with materials such as but not limited to fiberglass mesh, reinforcing sheets, carbon fibers, carbon nanotubes, ceramics, glass, arrays of metallic or non-metallic rods, or polymer compounds integrally formed in the core layer. It is also conceivable that a strengthening coat layer of micro or nanotechnology is added on the surface of the interlocking coupling parts.

It is conceivable that in a further embodiment of the panel at least one adhesive layer is directly attached to the bottom surface of the ceramic tile. In particular, it is possible that at least one adhesive layer is directly attached to the bottom surface of the ceramic tile without interference of an intermediate component, such as but not limited to a glue. The presence of an intermediate component might possibly affect the (protective) function of the adhesive layer in an undesired manner. However, it is conceivable that at least one adhesive layer is attached to the bottom surface by means of a glue (or a further adhesive). In such embodiment, preferably said glue or further adhesive does not permeate into the pores of the ceramic tile and/or said glue or further adhesive does not ingress into the core body of the ceramic tile. The core body of the ceramic tile is the region of the tile enclosed between the upper surface and the bottom surface. It is also conceivable that at least one adhesive layer is directly attached to the upper core surface of the core layer. Possibly, said adhesive layer is adhered to the surface of the core layer by means of a glue. In case the adhesive layer is attached to the core layer by means of a glue, it is preferred that the adhesive layer is impermeable such that said glue will not permeate through the adhesive layer. However, it is also possible that at least one adhesive layer is directly attached to the upper core surface of the core layer without interference of an intermediate component, such as but not limited to a glue or a further adhesive. Typically, the adhesive layer is adhered to the core layer and/or the ceramic tile by making use of the adhesive character of the adhesive layer which comprises an adhesive.

Preferably, at least one adhesive layer covers at least part of the bottom surface of the ceramic tile. Due to the presence of at least one adhesive layer which covers at least part of the bottom surface of the ceramic tile the co-action between the ceramic tile and the core layer can be improved. In a further preferred embodiment, at least one adhesive layer covers at least 50%, and preferably at least 80%, of the bottom surface (area) of the ceramic tile. In case at least 50%, and preferably at least 80% of the bottom surface of the ceramic tile the adhesive layer can already provide a relatively good protective function. In an embodiment, the adhesive layer being an adhesive has a top surface area less than or equal to the surface area of the bottom of the tile. In a further preferred embodiment, at least one adhesive layer substantially entirely covers the bottom surface of the ceramic tile. Hence, the surface of the adhesive layer preferably substantially equals the surface area of the bottom surface of the ceramic tile. In such way, protection of at least the bottom surface of the ceramic tile can be ensured. It is further possible that at least one adhesive layer substantially entirely covers the upper core surface of the core layer. Hence, the surface of the adhesive layer may be substantially equal to the upper surface of the core layer. It is also imaginable that at least one adhesive layer substantially encloses at least part of the ceramic tile, in particular the bottom surface of the ceramic tile. Hence, the adhesive layer may partially form an envelope for the ceramic tile, in particular the bottom surface of the ceramic tile.

The thickness of at least one adhesive layer typically varies between 0.1 mm and 5 mm, preferably between 0.5 mm and 2 mm. The adhesive layer could also have a thickness between 0.7 mm and 1.8 mm. Preferably, the (average) thickness of at least one adhesive layer is smaller than the thickness of the core layer and/or the thickness of the ceramic tile. The thickness of the adhesive layer is preferably substantially equal over the entire adhesive layer, but can have a thickness gradient to adjust to depth and texture fluctuations across the bottom surface of the tile.

Typically, at least one ceramic tile has a thickness between 2 and 20 mm, preferably between 5 and 15 mm, more preferably between 6.5 and 8 mm.

The ceramic tile as used in the panel according to the present invention may in a possible embodiment comprise at least 50% by weight of SiO2, in particular between 60 and 70% by weight. The ceramic tile may further comprise at least 15% by weight of Al2O3, in particular between 25 and 35% by weight. Possibly, the ceramic tile may comprise 5 to 10% by weight of various natural substances. Typically, at least one ceramic tile has a thickness between 2 and 20 mm, preferably between 5 and 15 mm, more preferably between 6.5 and 8 mm.

In a beneficial embodiment of the panel, at least part of the upper surface of the ceramic tile is provided with at least one decorative pattern or decorative image. It is for example possible that such decorative image or pattern is provided via printing, for example via digital and/or inkjet printing. It is also possible that at least one decorative pattern is formed by relief provided in the upper surface of the ceramic tile.

The bottom surface of the ceramic tile is typically substantially flat. This may improve the ability to obtain a sufficient connection between the ceramic tile and the further layers, in particular the adhesive layer and/or the core layer. It also may decrease the risk of breaking points, especially when the ceramic tile is combined with a core layer that features a substantially flat top surface.

The ceramic tile as used in the panel according to the present invention may in a possible embodiment comprise at least 50% by weight of SiO2, in particular between 60 and 70% by weight. The ceramic tile may further comprise at least 15% by weight of Al2O3, in particular between 25 and 35% by weight. Possibly, the ceramic tile may comprise 5 to 10% by weight of various natural substances.

In a preferred embodiment of the panel, the peripheral edges of at least one ceramic tile are positioned at a predetermined distance from the peripheral edges of at least one core layer such that a grout is formed when a plurality of panels are interconnected. Such grout could be filled with a grouting material, in order to fill and/or seal the seams between adjacent panels. The grouting material could be any type of grouting material suitable for use in combination with ceramic tiles. Preferably, said predetermined distance is equal over the entire length and/or width of the panel. Due to the peripheral edges of the ceramic tile being positioned at a predetermined distance from the peripheral edges of the core layer there is no need for the user to align the ceramic tiles in order to obtain an usable grout. Hence, when using panels of this embodiment, grouts between adjacent ceramic tiles are basically automatically formed when a plurality of panels are interconnected. When the grouts are filled with a grouting material, a relatively strong interconnection between adjacent ceramic tiles can be obtained.

The predetermined distance can for example be at least 0.5 mm, preferably at least 1 mm. Hence, the peripheral edges of the ceramic tile can be positioned in at least 0.5 mm distance from the peripheral edges of the core layer. Hence, in case all peripheral edges of the ceramic tile are positioned in at least 0.5 mm distance from the peripheral edges of the core layer, when interconnecting a plurality of such panels, a grout of at least 1 mm will be formed around each ceramic tile. It is for example conceivable that that the peripheral edges of the ceramic tile are positioned between 0.5 mm and 3 mm distance from the peripheral edges of the core layer. For example, the peripheral edges of the ceramic tile are positioned in at least 1 mm distance from the peripheral edges of the core layer.

The complementary coupling parts are typically configured for interconnection adjacent panels. Typically, at least one pair of opposite side edges of the core layer is provided with complementary coupling parts. For example, the core layer comprises at least one pair of complementary coupling parts on at least two of its opposite side edges. Said coupling parts may for example be interlocking coupling parts configured for mutual coupling of adjacent panels on multiple directions. Preferably, said interlocking coupling parts provide locking in both horizontal and vertical directions. Any suitable interlocking coupling parts as known in the art could be applied. For example, said interlocking coupling parts may be in the form of complementary tongue and groove, male and female receiving parts, a projecting strip and a recess configured to receive said strip or any other suitable form. It is conceivable the complementary coupling parts require a downward scissoring motion when engaging or are locked together by means of a horizontal movement. It is conceivable for provisions of reinforcement in the interlocking coupling parts to improve strength and prevent breakage thereof during installation of the panels. For example, the complementary or interlocking coupling parts may be reinforced with materials such as but not limited to fiberglass mesh, reinforcing sheets, carbon fibers, carbon nanotubes, ceramics, glass, arrays of metallic or non-metallic rods, or polymer compounds integrally formed in the core layer. It is also conceivable that a strengthening coat layer of micro or nanotechnology is added on the surface of the interlocking coupling parts.

It is conceivable that at least one core layer comprises a composite material, in particular a mineral composite material. The core layer may for example comprise a magnesium oxide or MgO-based composite. The core layer may for example comprise $MgCl_2$ and/or $MgSO_4$. The composite core layer may for example comprise at least 20% by weight of magnesium oxide. A non-limiting example of a possible composite core layer, is a core layer comprising 30 to 40% by weight magnesium oxide, 10 to 20% by weight magnesium chloride or magnesium sulfate, 10 to 15% by weight water, 5 to 10% by weight magnesium hydroxide, 5 to 10% by weight calcium carbonate, 5 to 50% by weight lignocellulose (e.g. wood fibers or cork) and/or 10-15% by weight additives. It is found that a composite core layer, in particular a mineral composite core layer, has a good stability to heat which is also beneficial for the panel as such. The density of at least one core layer is preferably between 1200 and 2000 kg/m3, more preferably between 1400 and 1600 kg/m3.

However, it is also conceivable that the density of at least one core layer is about 2000 kg/m3. The latter is for example possible when the core layer comprises an thermoplastic mineral composite. The thermoplastic mineral composite core layer may for example comprise 60 to 70% by weight of calcium carbonate, 20 to 25% by weight of polyvinyl chloride and possibly 5 to 10% by weight of additives. At least one core layer may comprise a density gradient, for example wherein the density near the upper core surface is higher than the density near the bottom core surface, or wherein the density near the upper core surface and the bottom core surface is higher than the density of a central region situated between said upper core surface and bottom core surface. A further non-limiting example of a possible core layer is an HDF based core layer comprising cellulose and a thermosetting resin. It is also conceivable that the core layer is an wood-based core layer comprising cellulose and/or a geopolymer based on magnesium oxide.

The core layer may for example have a thickness of at least 4 mm. It is for example possible that the thickness of the core layer is between 3 and 9 mm, preferably between 4 mm and 5.5 mm or between 5.5 mm and 7 mm. It is conceivable that at least one core layer comprises at least one reinforcing layer. The reinforcing layer can for example be a reinforcing mesh. Possibly, the core layer comprises at least two reinforcing layers, wherein a first reinforcing layer is located near the upper core surface and wherein a further reinforcing layer is located near the bottom core surface. Preferably, at least one reinforcing layer comprises a mesh or web, preferably comprising fiberglass, jute and/or cotton.

In a further possible embodiment, the panel may comprise at least one backing layer. It is for example conceivable that at least one backing layer is attached to the bottom core surface of the core layer. The backing layer may for example be attached to the core layer by means of an adhesive layer. The presence of a backing layer may improve the impact insulation class and sound transmission performance of the panel. Further, the backing layer may allow to absorb some subfloor irregularities. Preferably, the backing layer is made of a low-density material comprising irradiation-crosslinked polyethylene (IXPE), ethylene-vinyl acetate (EVA), cork and/or other materials with similar sound-dampening properties. A non-limiting example of a possible backing layer is a moisture-proof acoustic pad. The backing layer may for example be configured to improved acoustical performance of the panel. The thickness of at least one backing layer may for example be between 0.5 and 10 mm, preferably between 0.8 and 1.5 mm. Possibly, at least one backing layer may have a thickness of about 1 mm. The density of at least one backing layer is preferably between 85 to 200 kg/m3.

The panel according to the invention may further comprise at least one further adhesive layer. At least one further adhesive layer can for example be a substantially solid layer. Hence, the further adhesive layer can be applied during manufacturing of the panel as a solid layer. In case a further adhesive layer is applied, it is preferred that said further adhesive layer is positioned between the adhesive layer and the core layer. It is for example conceivable that at least one further adhesive layer is a film layer. The film layer may for example be a stretchable film layer. In a further preferred embodiment, at least one adhesive layer can be a heat shrinkable film layer. Such heat shrinkable film can be applied such that it substantially encloses at least part of the ceramic tile, in particular the bottom surface of the ceramic tile. Hence, at least part of the ceramic tile may be wrapped by the film layer. A substantially formfitting connecting between the film layer and at least part of the ceramic tile may be obtained. The heat shrinkable further adhesive layer may for example be made of polyolefin. It is also possible that the heat shrinkable adhesive layer comprises PVC, polyethylene and/or polypropylene.

The invention also relates to a panel, in particular a floor panel or a wall panel configured for forming a floor or wall covering, the panel comprising at least one core layer, the core layer comprising at least one pair of opposite side edges which is provided with complementary coupling parts, the core layer comprising an upper core surface and a bottom core surface, and at least one ceramic tile, the ceramic tile comprising an upper surface and a bottom surface, wherein at least one adhesive layer is provided between the ceramic tile and the core layer, wherein the adhesive layer does not ingress into the pores of the bottom surface of the ceramic tile and/or wherein the (upper surface of the) adhesive layer follows (or substantially equals) the bottom surface of the ceramic tile. The invention also relates to a panel, in particular a floor panel or a wall panel configured for forming a floor or wall covering, the panel comprising at least one core layer, the core layer comprising at least one pair of opposite side edges which is provided with complementary coupling parts, the core layer comprising an upper core surface and a bottom core surface, and at least one ceramic tile, the ceramic tile comprising an upper surface and a bottom surface, wherein at least one adhesive layer is provided between the ceramic tile and the core layer, and wherein the adhesive layer is configured to substantially seal the pores and/or openings at the bottom surface of the ceramic tile. Said embodiment can be combined with any of the described preferred embodiments according to the present invention.

The invention also relates to a panel, in particular a floor panel or a wall panel configured for forming a floor or wall covering, comprising at least one core layer comprising an at least one pair of opposite side edges which is provided with an at least two complementary coupling parts, an upper core surface and a bottom core surface, and at least one ceramic tile comprising an upper surface and a bottom surface, and at least one adhesive layer provided between the ceramic tile and the core layer, wherein the adhesive layer has a viscosity of more than 1,000 Pas at time of application. Said embodiment can be combined with any of the described preferred embodiments according to the present invention.

The invention also relates to a method of manufacturing a panel, in particular a floor panel or a wall panel configured for forming a floor or wall covering, in particular a panel according to the present invention, the method comprising the steps of:

a) providing at least one core layer comprising an at least one pair of opposite side edges which is preferably provided with an at least two complementary coupling parts, an upper core surface and a bottom core surface;

b) applying at least one adhesive onto the upper core surface of the core layer, wherein the adhesive is preferably substantially viscous and preferably has a viscosity of at least 1,000 Pas, more preferably more than 12,000 at time of application.

c) providing at least one ceramic tile comprising an upper surface and a bottom surface;

d) positioning at least one ceramic tile upon the upper core surface of the core layer which is provided with adhesive; and e) applying a load upon the ceramic tile such that the at least part of the adhesive is spread over the upper core surface thereby forming an adhesive layer which fixes the ceramic tile onto the core layer; and f) preferably allowing the adhesive to cure.

The method according to the present invention experiences the same benefits as described for the corresponding panel according to the present invention. Due to the adhesive being applied onto the upper core surface of the core layer in a substantially viscous form, wherein the adhesive preferably has a viscosity higher than 1,000 Pas at time of application, and possibly at 20 degrees Celsius, the overall manufacturing of the panel is relatively simple. The adhesive enables both the mutual fixation of the ceramic tile and the core layer and the formation of a adhesive layer. As indicated above, the adhesive layer according to the present invention fulfils several functions which in particular contribute to the durability of the panel.

In a further preferred embodiment, during step b) multiple fractions of adhesive are applied onto the upper core surface of the core layer. It is further possible that multiple fractions of adhesive are applied in a predetermined pattern. The fractions of adhesive can for example be applied via multiple nozzles. In this way the spreading of adhesive and/or the thickness of the final adhesive layer can be at least partially controlled. Preferably, a thermoplastic adhesive is chosen where at step b), the adhesive is applied at a temperature of at least 80 degrees Celsius or preferably equal to or greater than 100 degrees Celsius preferably in temperatures between 120 to 160 degrees Celsius. At this temperature range, the thermoplastic adhesive's viscosity is reduced to the desired range, for example to at least 12,000 Pas or preferably between 12,000 to 15,000 Pas, wherein it does not permeate into the pores of the ceramic tile but still offers sufficient adhesion. Hence, a preferred viscous state of the adhesive can be obtained. At least one adhesive preferably has a viscosity of more than 1,000 Pas at application, preferably more than 5,000 Pas, even more preferably more than 10,000 Pas. The method may further comprise step f) enabling solidification and/or curing of the (adhesive of the) adhesive layer.

The invention also relates to a panel obtained via a method according to the present invention.

The invention will be further explained with reference to the appended figures wherein.

Similar references in these figures refers to the same or equivalent technical features or components.

Figure 1:
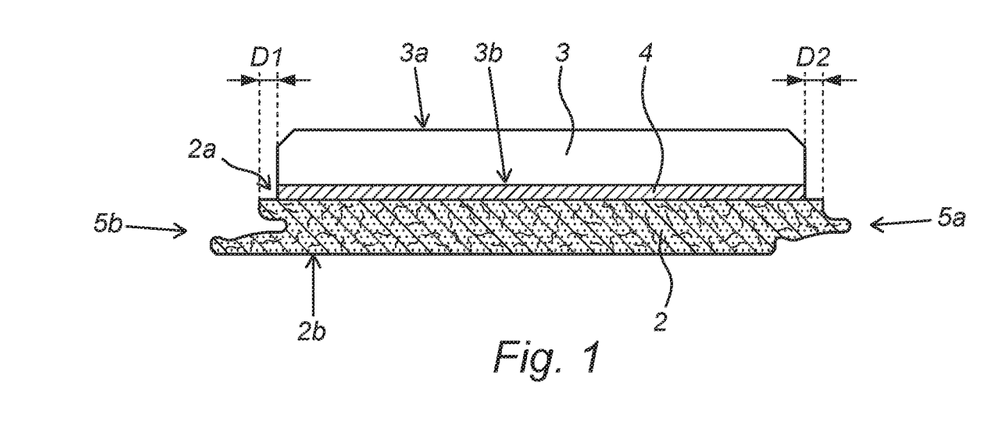
FIG. 1 shows a cross section of a possible embodiment of the panel according to the present invention, FIG. 2 two panels as shown in FIG. 1 in a mutually coupled position.

FIG. 1 shows a panel 1, in particular a floor panel 1 or wall panel 1 configured for assembling a floor or wall covering by interconnecting a plurality of said panels 1 with each other. The panel 1 comprises a core layer 2 and a ceramic tile 3. The core layer 2 comprises pairs of opposite side edges, wherein at least one of said pair of opposite edges comprising complementary coupling parts 5a, 5b. The core layer 2 comprises an upper core surface 2a and a bottom core surface 2b. The ceramic tile 3 comprises an upper surface 3a and a bottom surface 3b. The panel further comprises a adhesive layer 4 provided at the bottom surface 3b of the ceramic tile 3. The adhesive layer 4 is preferably impermeable and covers at least part of the bottom surface 3b of the ceramic tile 3. In the shown embodiment, the peripheral edges of the ceramic tile 3 are positioned at a predetermined distance D1, D2, from the peripheral edges of the core layer 2. In the shown embodiment, the adhesive layer 4 substantially entirely covers the bottom surface 3b of the ceramic tile 3. At least one adhesive layer 4 can form integral part of the ceramic tile 3 and/or at least one adhesive layer 4 is a separate layer which is (directly) attached to the bottom surface 3b of the ceramic tile 3.

Figure 2:
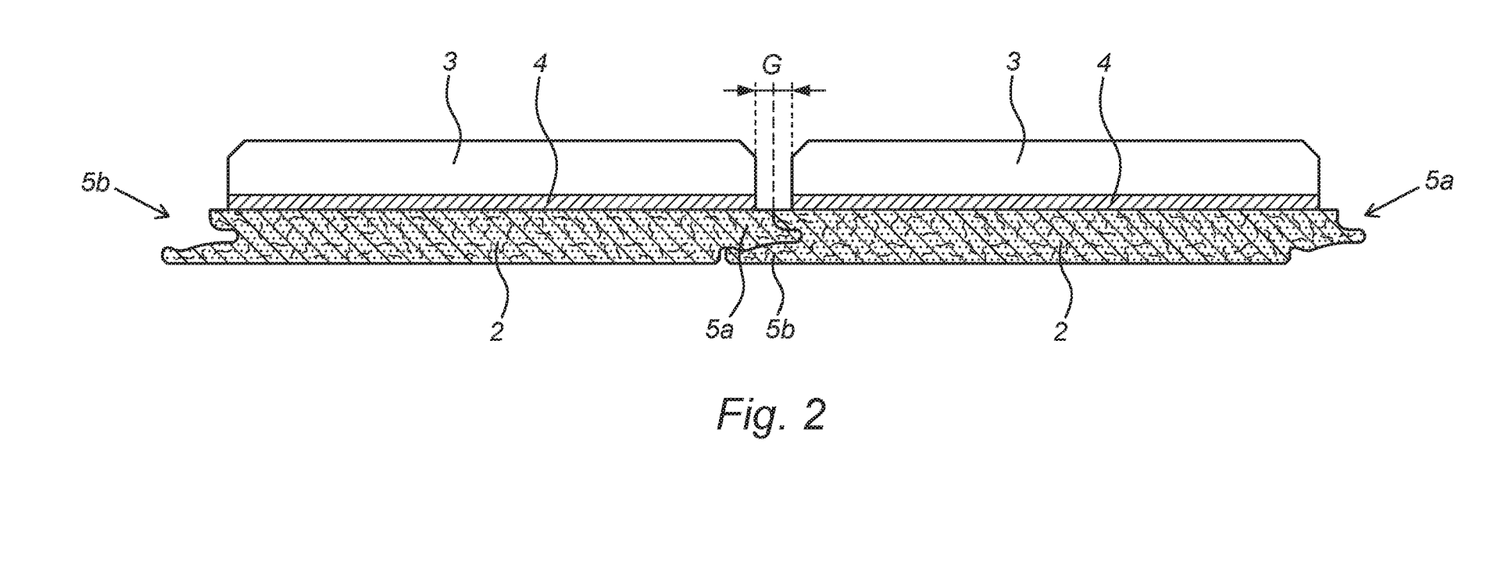

FIG. 2 shows a cross sectional view of two panels 1 as shown in FIG. 1 which are mutually coupled. It can be seen that the peripheral edges of each ceramic tile 3 are positioned at a predetermined distance D1, D2, from the peripheral edges of the core layer 2 such that a grout G is formed when a plurality of panels 1 are interconnected. The grout G has a length which substantially equals the abovementioned predetermined distances D1, D2. The grout G can be filled with a grouting material, in order to fill and/or seal the seams between the adjacent panels 1.

Figure 3:
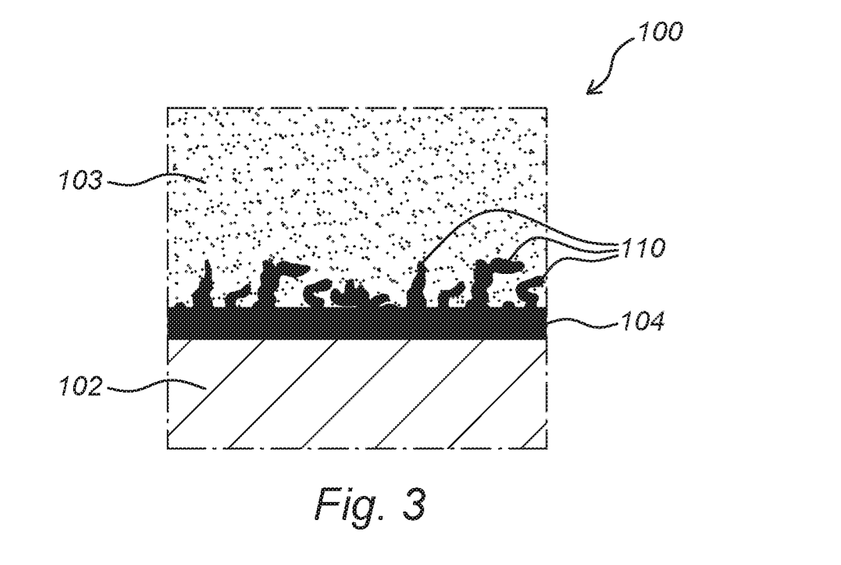
FIG. 3 shows a detailed view of a panel according to the prior art.

FIG. 3 shows a detailed view of a panel 100 according to the prior art. The panel 100 has a ceramic tile 103 and a core layer 102 which are attached via an intermediate layer 104. It can be seen that the resin material of the intermediate layer 104 has permeated into the pores 110 of the ceramic tile 103. The resin permeated the pores 110 of the ceramic tile 103 up to the core body thereof. This typically occurs when applying a resin and/or adhesive having a relatively low viscosity, in particular lower than 1,000 Pas. The resin being permeated into the pores 110 often causes stress in the body of the ceramic tile 103 during use which will lead to local deformation at the bottom surface of the ceramic tile 103 and/or hairline fractures on the upper surface of the ceramic tile 103. This may subsequently lead to breakage of the ceramic tile 103.

Figure 4:
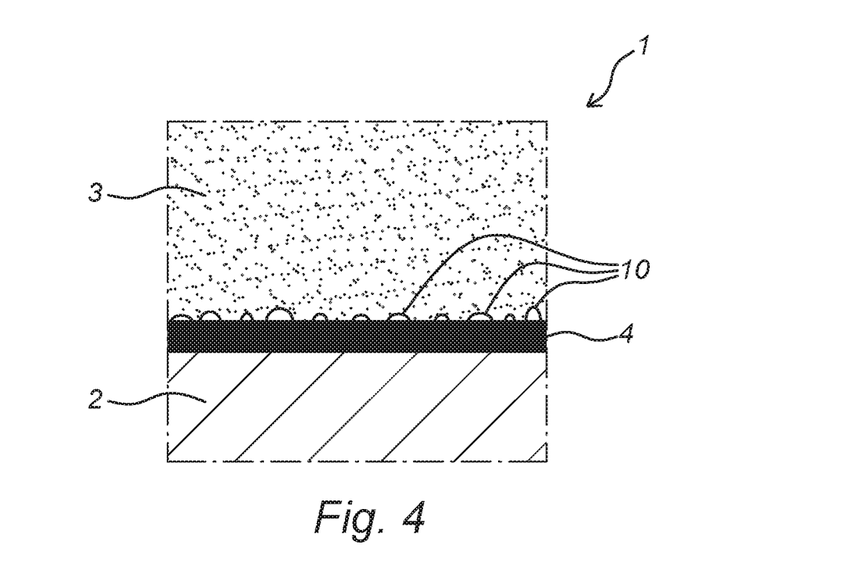
FIG. 4 shows a detailed view of a panel according to the present invention.

FIG. 4 show a detailed view of a panel 1 according to the present invention. The figure shows a detailed view of the ceramic tile 3, adhesive layer 4 and core layer 2. The ceramic tile 3 has multiple pores 10 due to the ceramic material having a porous structure. The figure shows that the adhesive layer 4 does not permeate into the pores 10 of the ceramic tile 3. The adhesive layer 4 basically forms a seal for the bottom surface of the ceramic tile 3. This is enabled due to the adhesive layer 4 comprising at least one adhesive having a viscosity higher than 1,000 Pas, in particular at 20 degrees Celsius.

Figure 5A:
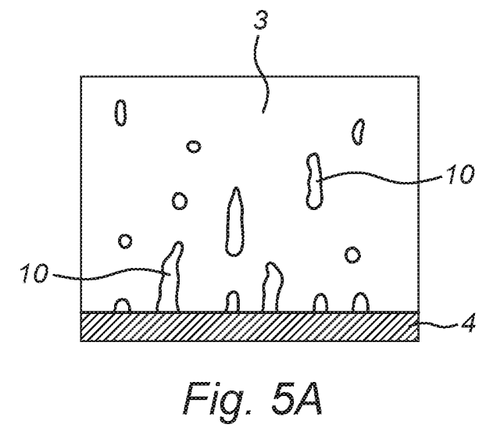
FIG. 5A shows a detailed view of a ceramic tile and an adhesive according to the present invention.
Figure 5B:
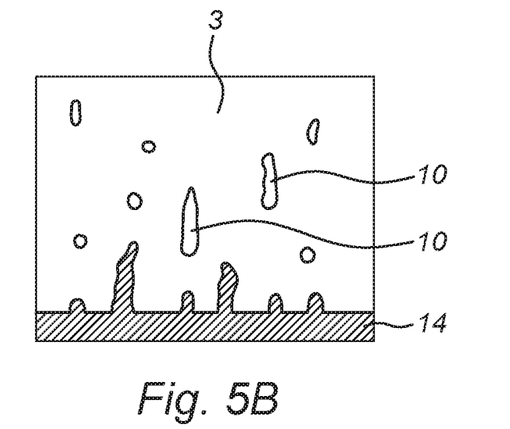
FIG. 5B shows a detailed view of a ceramic tile and an adhesive according to the prior art.

FIGS. 5A and 5B show a detailed view of a ceramic tile 3, in particular a porcelain tile 3 which could be applied in a panel according to the present invention. The porcelain tile 3 has an absorption rate of less than 0.5% and has minimal to no interconnectedness in the surface and inside pores 10. In FIG. 5B, when an adhesive 14 according to the prior art with viscosity values less than 1000 Pas is poured on its surface, the adhesive 14 permeates the surface pores 10. On the other hand, as shown in FIG. 5A, when the adhesive's viscosity is equal to or greater than 1000 Pas, the adhesive remains in the surface without seeping through the surface pores 10 thereby forming an adhesive layer 4 according to the present invention. Thus, permeation of the pores 10 basically does not take place.

Figure 6A:
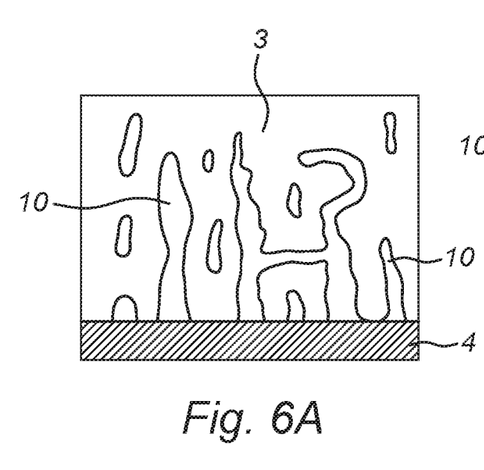
FIG. 6A shows a detailed view of a ceramic tile and an adhesive according to the present invention.
Figure 6B:
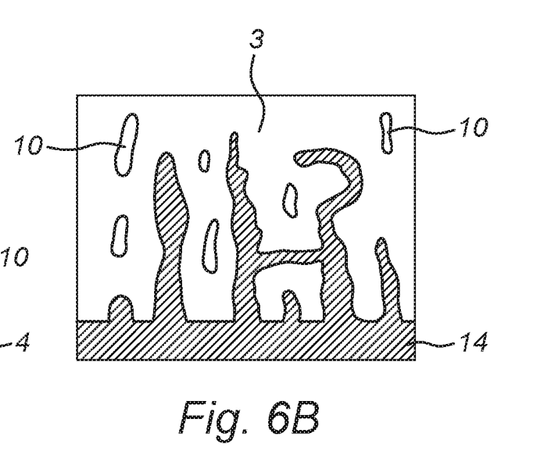
FIG. 6B shows a detailed view of a ceramic tile and an adhesive according to the prior art.

FIGS. 6A and 6B present a ceramic tile 3 which could be applied in a panel according to the present invention. The ceramic tile 3 has a porosity of up to 7%, with bigger sized and possibly interconnected pores 10. In FIG. 6B, the adhesive 14 according to the prior art having a viscosity of less than 12,000 Pas permeates into the ceramic tile's body 3 defined by the depth of the interconnected pores 10. On the other hand, as shown in FIG. 6A, the adhesive's viscosity value is equal to or increases to 12,000 Pas. It is shown that in this event, permeation of the adhesive 4 into the ceramic tile's body does not take place, and the adhesive 4 forms a protective adhesive layer 4.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

When it is referred to a ceramic tile also a porcelain tile can be meant. A ceramic tile according to the present invention is for example a tile comprising a ceramic material. It is also conceivable that the ceramic tile is substantially made of a ceramic material.

The verb "comprise" and conjugations thereof used in this patent publication are understood to mean not only "comprise", but are also understood to mean the phrases "contain", "substantially consist of", "formed by" and conjugations thereof. When it is referred to reinforcing layer also a reinforcing element can be meant, or vice versa.

The invention claimed is:

1. A panel configured for forming a floor or wall covering, comprising:
   at least one core layer comprising at least one pair of opposite side edges which is provided with at least two complementary coupling parts, an upper core surface and a bottom core surface; and
   at least one ceramic tile comprising an upper surface and a bottom surface, wherein the bottom surface defines a bottom surface area;
   at least one adhesive layer provided between the ceramic tile and the core layer;
   wherein the bottom surface of the ceramic tile comprises pores, wherein the pores define a void surface area,
   and wherein the contact surface area between the adhesive layer and the ceramic tile is defined by the difference between the bottom surface area and the void surface area, wherein the adhesive layer comprises an adhesive having a viscosity of more than 1,000 Pas at the time of application.

2. The panel according to claim 1, wherein the adhesive layer comprises an adhesive having a viscosity of more than 12,000 Pas at the time of application.

3. The panel according to claim 1, wherein the adhesive layer is impermeable, in particular impermeable to liquids.

4. The panel according to claim 1, wherein the adhesive is a polymer resin.

5. The panel according to claim 1, wherein the adhesive is a single-component adhesive, in particular a single-component adhesive comprising polyurethane.

6. The panel according to claim 1, wherein the bottom surface of the ceramic tile comprises macroscopic undulations of a width between 1-50 mm and a depth between 0.1-2 mm.

7. The panel according to claim 1, wherein the at least one adhesive layer substantially or entirely covers the bottom surface of the ceramic tile.

8. The panel according to claim 1, wherein the at least one adhesive layer has a thickness between 0.5 mm and 5 mm.

9. The panel according to claim 6, wherein the shape of the top surface of the adhesive layer conforms to the macroscopic undulations of the tile bottom surface.

10. The panel according to claim 1, wherein the at least one adhesive layer is directly attached to the bottom surface of the ceramic tile.

11. The panel according to claim 1, wherein the at least one ceramic tile has a porosity between 0.1% and 10% and wherein the at least one ceramic tile has a thickness between 2 and 20 mm.

12. The panel according to claim 1, wherein the peripheral edges of the at least one ceramic tile are positioned at a predetermined distance from the peripheral edges of the at least one core layer such that a grout joint is formed when a plurality of panels are interconnected.

13. The panel according to claim 1, wherein the at least one core layer comprises a mineral composite material.

14. The panel according to claim 1, wherein the at least one core layer has a density between 900 and 2000 kg/m3 and wherein the at least one core layer has a thickness between 4 mm and 9 mm.

15. A method of manufacturing a panel configured for forming a floor or wall covering, comprising the steps of:
   a) providing at least one core layer comprising an at least one pair of opposite side edges which is provided with an at least two complementary coupling parts, an upper core surface and a bottom core surface;
   b) applying at least one adhesive onto the upper core surface of the core layer, wherein the adhesive has a viscosity of at least 1,000 Pas at time of application;
   c) providing at least one ceramic tile comprising an upper surface and a bottom surface;
   d) positioning at least one ceramic tile upon the upper core surface of the core layer which is provided with the adhesive; and
   e) applying a load upon the ceramic tile such that the adhesive is spread over the upper core surface thereby forming an adhesive layer which fixes the ceramic tile onto the core layer.

16. The method according to claim 15, wherein during step b) multiple layers of adhesive are applied onto the upper core surface of the core layer.

17. The method according to claim 15, wherein at step b), the adhesive is applied at a temperature of between 100 degrees Celsius to 200 degrees Celsius.

18. The method according to claim 15, wherein the at least one adhesive has a viscosity of more than 1,200 Pas at time of application.

19. The method according to claim 15, wherein the at least one adhesive has a viscosity greater than 12,000 Pas at temperatures in the range of 100 degrees Celsius to 200 degrees Celsius.

20. The method according to claim 15, further comprising step f) allowing the adhesive to cure.

* * * * *